(12) United States Patent
Kim

(10) Patent No.: US 7,429,709 B2
(45) Date of Patent: Sep. 30, 2008

(54) KEYPAD PCB ASSEMBLY FOR MOBILE PHONE WITH LIGHT GUIDE PLATE

(75) Inventor: Woo-Chun Kim, Kyeongsangnam-Do (KR)

(73) Assignee: KBF Co. Ltd., Kyeongsangnam-Do (KR)

( * ) Notice: Subject to any disclaimer, the term of this patent is extended or adjusted under 35 U.S.C. 154(b) by 0 days.

(21) Appl. No.: 11/739,738

(22) Filed: Apr. 25, 2007

(65) Prior Publication Data

US 2007/0247828 A1   Oct. 25, 2007

(30) Foreign Application Priority Data

Apr. 25, 2006   (KR) .................. 10-2006-0037405

(51) Int. Cl.
*H01H 9/18* (2006.01)
(52) U.S. Cl. .................. 200/310; 200/314; 200/317
(58) Field of Classification Search .............. 200/406, 200/516, 517, 310–317; 341/20, 22, 23, 341/28; 345/168–170
See application file for complete search history.

(56) References Cited

U.S. PATENT DOCUMENTS

| | | | |
|---|---|---|---|
| 5,083,240 A | | 1/1992 | Pasco |
| 6,373,008 B1 * | | 4/2002 | Saito et al. .................. 200/310 |
| 6,595,653 B2 * | | 7/2003 | Saito et al. ................... 362/84 |
| 6,860,612 B2 * | | 3/2005 | Chiang et al. ................ 362/29 |
| 6,960,733 B2 * | | 11/2005 | Hanahara et al. ............ 200/314 |
| 7,015,408 B2 * | | 3/2006 | Hirahata et al. ............. 200/310 |
| 7,019,242 B2 * | | 3/2006 | Kim ........................... 200/514 |
| 7,053,799 B2 * | | 5/2006 | Yu et al. ...................... 341/31 |
| 7,067,753 B1 * | | 6/2006 | Cheng ......................... 200/310 |
| 7,186,935 B2 | | 3/2007 | Lee et al. |
| 7,186,936 B2 * | | 3/2007 | Marcus et al. ............... 200/310 |
| 7,232,969 B1 * | | 6/2007 | Hsu et al. .................... 200/310 |
| 7,244,899 B2 * | | 7/2007 | Jung et al. ................... 200/314 |
| 7,294,803 B2 * | | 11/2007 | Lee et al. .................... 200/314 |

* cited by examiner

*Primary Examiner*—Michael A Friedhofer
(74) *Attorney, Agent, or Firm*—DeLio & Peterson, LLC; Peter W. Peterson

(57) ABSTRACT

A keypad printed circuit board (PCB) assembly for a mobile phone integrated with a light guide plate providing a light-emitting function using a light emitting diode (LED) and the light guide plate is provided. The keypad PCB assembly includes a PCB on which a plurality of light emitting diodes (LEDs) is surface-mounted such that they are able to emit light from a side of the PCB, a metal dome section including metal dome parts attached to positions corresponding to signal contacts of the PCB, and a dome tape covering a gap between the metal dome parts excluding a portion overlapped with the LEDs, and a light guide plate coupled to an upper portion of the metal dome section so that the light guide plate and the metal dome section are integrated into one piece, leaving the space therebetween, and having thereunder an uneven pattern reflecting light incident from the LEDs, an LED cover provided on a position corresponding to the LEDs, and a circumferential light-shielding part filling the end-side space between the light guide plate and the metal dome section.

4 Claims, 3 Drawing Sheets

KEYPAD PCB ASSEMBLY FOR MOBILE PHONE WITH LIGHT GUIDE PLATE

BACKGROUND OF THE INVENTION

1. Field of the Invention

The present invention relates to a keypad printed circuit board (PCB) assembly for a mobile phone, and more particularly to a keypad PCB assembly for a mobile phone integrated with a light guide plate providing a light-emitting function using a light emitting diode (LED) and the light guide plate.

2. Description of Prior Art

As generally known in the art, a light-emitting device of a keypad for a mobile phone is mainly a light-emitting diode (LED) type, but recently, there has been a trend towards distributing an electroluminescence (EL) type in high-cost models.

The LED type is a type in which LEDs are surface-mounted to many positions (e.g., 10 to 20 points) on a keypad to illuminate the whole of the keypad. Such an LED type has problems in that due to using so many LEDs, high power consumption is caused to shorten the lifetime of a battery, and in view of light-emitting, a difference in luminance occurs depending upon near-far effect from the LEDs, causing inhomogeneity in light-emitting.

The EL type is realized as an EL sheet having high power saving, super thinning, and homogeneous light-emitting features, and is thus spotlighted. However, the EL type has problems in that noises occur due to electrical interference, and it needs a high cost driving circuit, thereby increasing production costs.

Further, while there is an attempt to improve the quality of light-emitting by adapting a light guide plate for back light to a mobile phone, there is not yet proposed a practical method of manufacturing a light-emitting assembly to solve the above problems as well as to satisfy the objective light-emitting feature and easy productivity.

SUMMARY OF THE INVENTION

Accordingly, the present invention has been made to solve the above-mentioned problems occurring in the prior art, and the present invention provides a keypad printed circuit board (PCB) for a mobile phone integrated with a light guide plate and using a light emitting diode (LED) and a light guide plate while solving the problems of a conventional LED type structure, such as inhomogeneity in light emission and higher power consumption. The keypad PCB has advantages of an electroluminescence (EL)-type light emission structure, such as power saving, super thinning, and homogeneous light-emission features without adopting the EL type structure having defects of high costs and noise occurrence.

In order to accomplish the above object, in accordance with an aspect of the present invention, there is provided a keypad printed circuit board (PCB) assembly for a mobile phone comprising: a PCB on which a plurality of light emitting diodes (LEDs) is surface-mounted such that they are able to light-emit from a side of the PCB; a metal dome section including metal dome parts attached to positions corresponding to signal contacts of the PCB and a dome tape covering a gap between the metal dome parts excluding a portion overlapped with the LEDs; and a light guide plate coupled to an upper portion of the metal dome section so that the light guide plate and the metal dome section are integrated into one piece, leaving the space therebetween, and having thereunder an uneven pattern reflecting light incident from the LEDs, an LED cover provided on a position corresponding to the LEDs, and a circumferential light-shielding part filling the end-side space between the light guide plate and the metal dome section.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
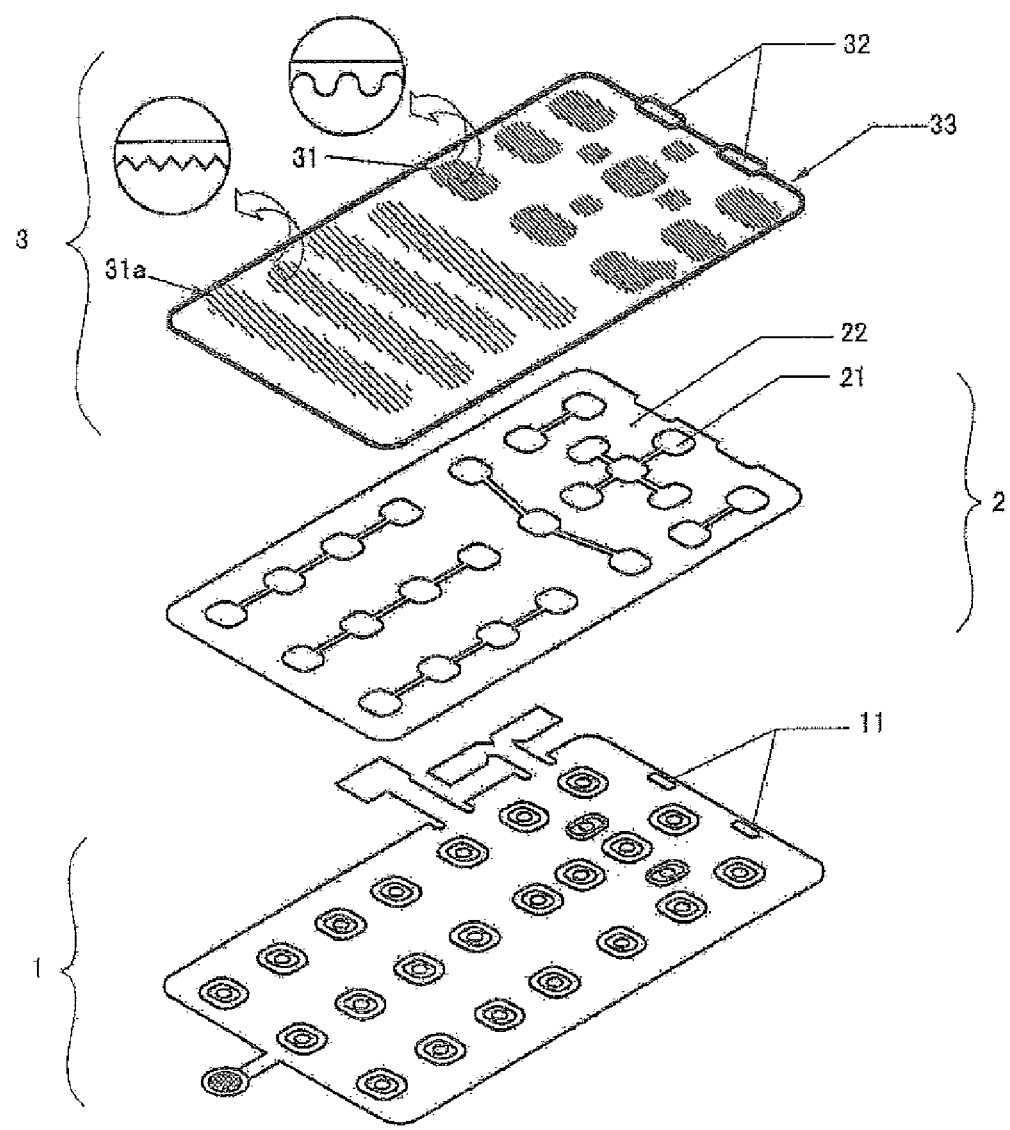
FIG. 1 is an exploded perspective view of a keypad light-emitting printed circuit board (PCB) assembly according to the present invention.

Hereinafter, an exemplary embodiment of the present invention will be described with reference to the accompanying drawings. In the following description and drawings, the same reference numerals are used to designate the same or similar components, and so repetition of the description on the same or similar components will be omitted.

FIG. 1 is an exploded perspective view of a keypad light-emitting printed circuit board (PCB) assembly according to the present invention. The PCB assembly includes a printed circuit board (PCB), a metal dome section, and a light guide plate as named from the bottom.

The present invention relates to a keypad PCB for a mobile phone having a light-emission function. The elements other than light-emission function-related elements are the same as those of a conventional keypad for a mobile phone, so the detailed explanation thereof will be omitted.

As for the PCB 1, a PCB adopted to an electroluminescence (EL) keypad or a flexible printed circuit board is generally used. On the PCB, light emitting diodes (LEDs) 11 (preferably, two LEDs) capable of side light-emitting are mounted in series on the surface of the PCB along one side (preferably, along the upper side) of the PCB so as to be apart from each other. Here, the side light-emitting LED includes an LEC having a side view function or an LED capable of providing a side light-emitting function through a structural modification. In principle, the LED is enough so long as it can provide side light-emitting parallel with a keypad.

The metal dome section 2 includes a metal dome parts 21 and a dome tape 22, which are coupled to the upper side of the PCB. The metal dome parts are provided on positions corresponding to contact points between the keypad and the PCB. The dome tape fills an uneven portion formed by the metal dome parts and covers the metal dome parts, thereby fixing the metal dome parts in place. The metal dome section may be generally adopted from that of an EL keypad, but according to the present invention, a light guide plate instead of an EL sheet is coupled to the metal dome section so that the dome tape is coated with a reflecting layer reflecting light without absorption so as to prevent light loss of the LED. Here, the coating is carried out over the whole dome tape except a portion where the LEDs are located, so as to allow light from the LEDs to be directed toward the metal dome section.

The light guide plate 3 is a thin film contributing to light diffusion, and is generally made of transparent polycarbonate or rubber material. The light guide plate includes an uneven pattern 31, an LED cover 32, and a circumferential light-shielding part 33. The light guide plate is coupled to the upper portion of the metal dome section, leaving the space therebetween, so that LED light incident to the metal dome section from a side of the PCB is concentrated on the uneven pattern portion while remaining on specified portions (keys of the keypad) by the uneven pattern formed under the light guide plate.

The design of the uneven pattern 31 is an important factor influencing luminance or homogeneity of light, so that it has to be modified in accordance with product design or a surface-mounting position of an LED.

Figure 2:
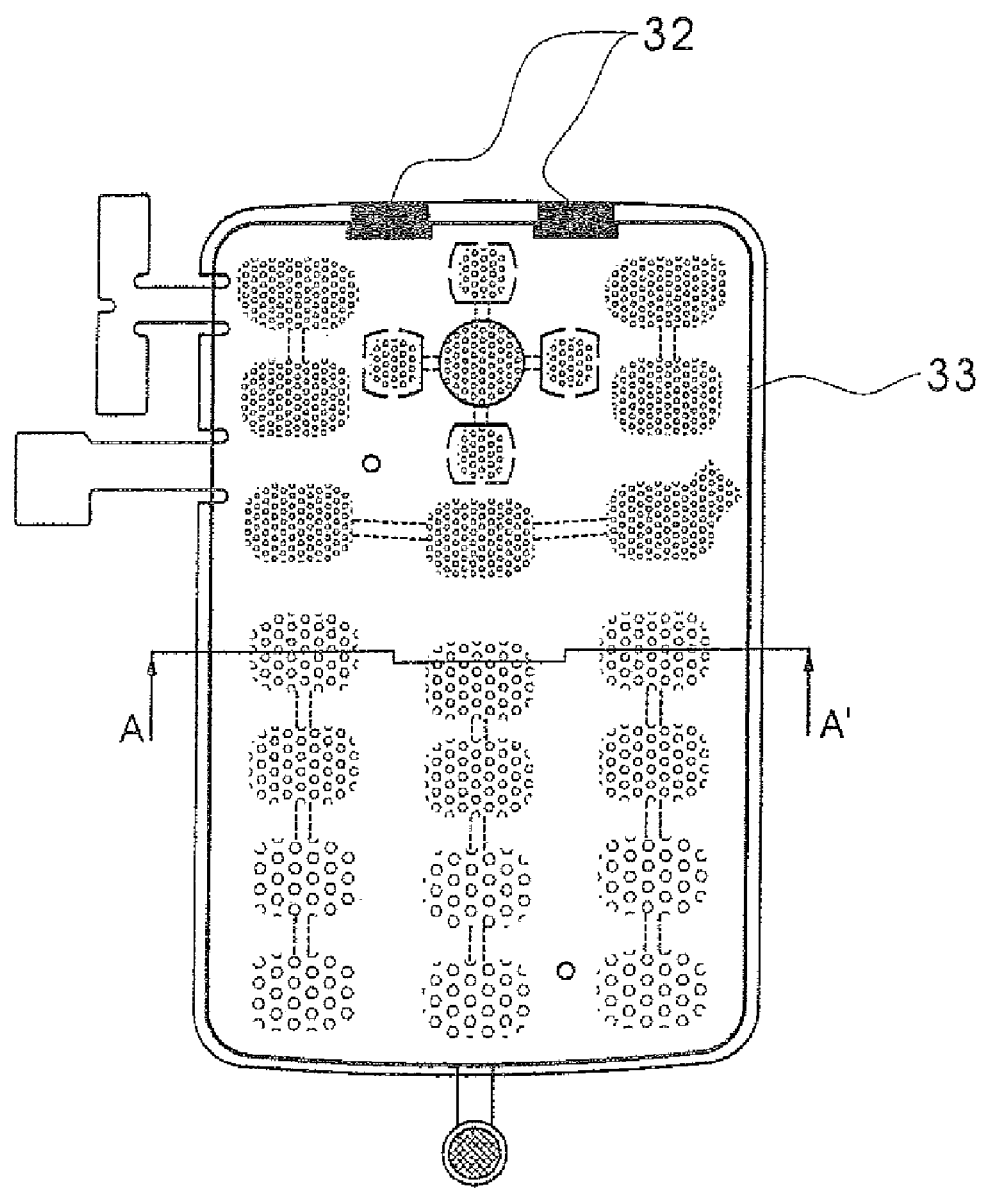
FIG. 2 is a plan view of the keypad light-emitting PCB assembly (a first embodiment) according to the present invention.

That is, it is important to design the uneven pattern such that the size and the density of the pattern are modified in accordance with a distance from a light source and a light-emission angle. In FIG. 2, a key near the LED light source is designed to have a smaller, lower pattern so as to allow light to pass through in great quantities, and a key far from the light source is designed to have a larger, dense pattern considering a positional problem in that an absolute quantity of light must be poor, so as to block light passage and preserve light therein in greater quantities.

Figure 4:
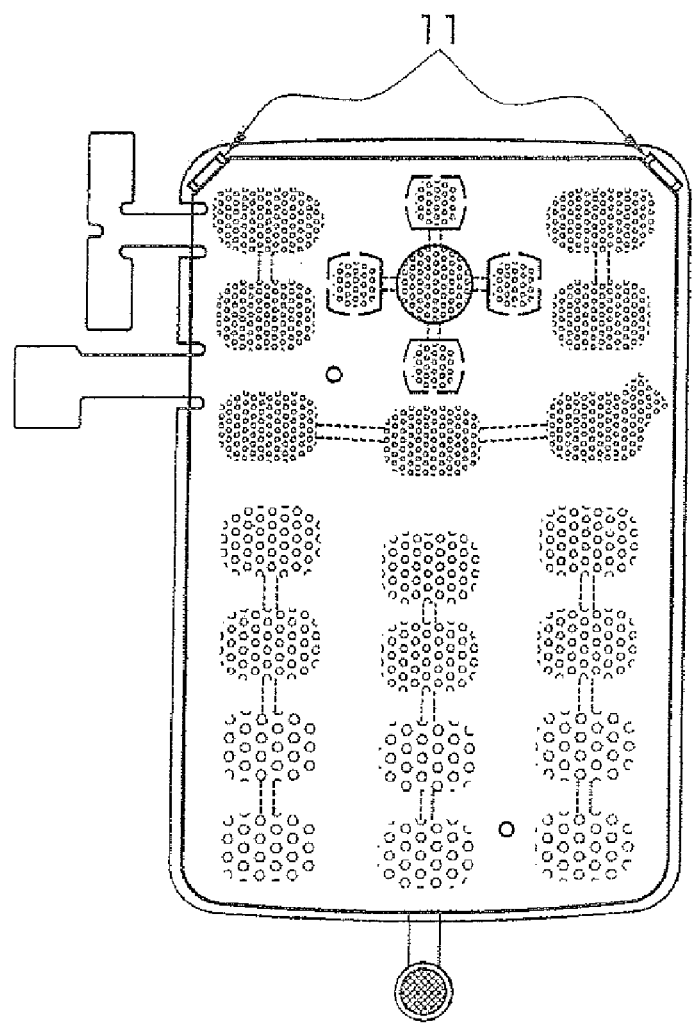
FIG. 4 is a plan view of the keypad light-emitting PCB assembly (a second embodiment) according to the present invention.

The uneven pattern may be solely designed for each key depending on the shape of the key, or otherwise, it may be designed into a shape such as a stripe pattern denoted as a reference numeral 31a covering a plurality of keys. FIG. 4 is an exemplary view of the PCB assembly in which the LEDs are surface-mounted on both upper edges of the keypad, and a stripe pattern is adopted as an uneven pattern of the light guide plate. Like this, it is possible to modify a surface-mounting position of an LED and a shape of an uneven pattern into diverse types.

However, the most important point in designing an uneven pattern is to maximize the efficiency of light transmission, which can be controlled by the density and height of the pattern due to a difference in brightness, but in basic, a pattern-forming position should be an under face of the light guide plate. If a reflection pattern is formed on the upper portion of the light guide plate, light loss occurs so that light guide effect is not realized normally. The reflection pattern may be modified in various forms so long as it has the above function.

In addition, on the light guide plate, the LED cover 32 coated with a reflection layer is installed on a position corresponding to an LED position so as to prevent light from being refracted and lost while being directed upward from the light guide plate. Furthermore, the circumferential light-shielding part 33 is provided to fill the space between the light guide plate and the dome section so as to prevent light from leaking through the side of the light guide plate.

Figure 3:
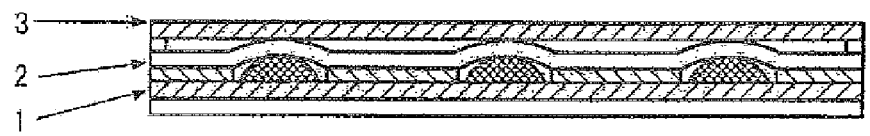
FIG. 3 is a sectional view taken along line A-A' of FIG. 2.

FIG. 3 is a sectional view taken along line A-A' of FIG. 2, in which the assembled state of the PCB, the metal dome section, and the light guide plate is shown. It is shown that the space between the light guide plate and the metal dome section is formed by the adhesion therebetween so as to allow light to be guided through the space.

The present invention relates to a technique of the keypad PCB for a mobile phone integrated with the light guide plate, and provides the keypad PCB in which the light guide plate is integratedly coupled to the PCB, on which a dome switch, a driving circuit, an LED, etc. are surface-mounted, the light guide plate being provided with a light-reflection pattern to allow LED light to be directed through the pattern.

Such a structural difference makes it possible to incorporate the application of the light guide plate in a manufacturing process of the PCB, providing the effects of easy manufacturing and high product reliability. Moreover, the difference enables the technology of the light guide plate satisfying both economy and functionality to be applied to the keypad of a mobile phone successfully.

The present invention has significance for proposing a PCB structure and a manufacturing method thereof capable of securing stability of the LED keypad while providing a thinner, high power-saving structure like a conventional EL keypad on a basis of a technical idea of using the light guide plate instead of an EL sheet.

Thus, among the elements adopted to the conventional keypad structure, some elements used in the present invention can be modified in various forms, so that the technical scope of the present invention has to be determined taking the above fact into consideration, and it cannot be asserted that the modification in the portion corresponding to the prior art does not pertain to the present invention.

According to the present invention, as an improved technology of a light-emitting keypad PCB assembly, the structure and manufacturing method thereof are capable of realizing a super thinning keypad like an EL keypad, using the light guide plate and the LED are provided.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A keypad printed circuit board (PCB) assembly for a mobile phone comprising:
   a PCB on which a plurality of light emitting diodes (LEDs) is surface-mounted such that the LEDs are able to emit light from a side of the PCB;
   a metal dome section including metal dome parts attached to positions corresponding to signal contacts of the PCB, and a dome tape covering a gap between the metal dome parts excluding a portion overlapped with the LEDs; and
   a light guide plate coupled to an upper portion of the metal dome section so that the light guide plate and the metal dome section are integrated into one piece, leaving a space therebetween, and having thereunder an uneven pattern reflecting light incident from the LEDs, an LED cover provided on a position corresponding to the LEDs, and a circumferential light-shielding part filling an end-side space between the light guide plate and the metal dome section.

2. The keypad PCB assembly as claimed in claim 1, wherein the uneven pattern of the light guide plate is solely formed according to a position of a key, or is formed in a stripe pattern covering a plurality of keys, the pattern being designed such that size and density of the pattern varies according to a distance from one of the LEDs.

3. The keypad PCB assembly as claimed in claim 1, wherein two LEDs are separately provided in series along an upper side of the PCB.

4. The keypad PCB assembly as claimed in claim 1, wherein the dome tape of the metal dome section is coated with a reflection layer reflecting light upward.

* * * * *